No. 608,121. Patented July 26, 1898.
G. HERR, W. CUNNINGHAM & F. HERR.
HARROW.
(Application filed Jan. 17, 1898.)
(No Model.) 2 Sheets—Sheet 1.
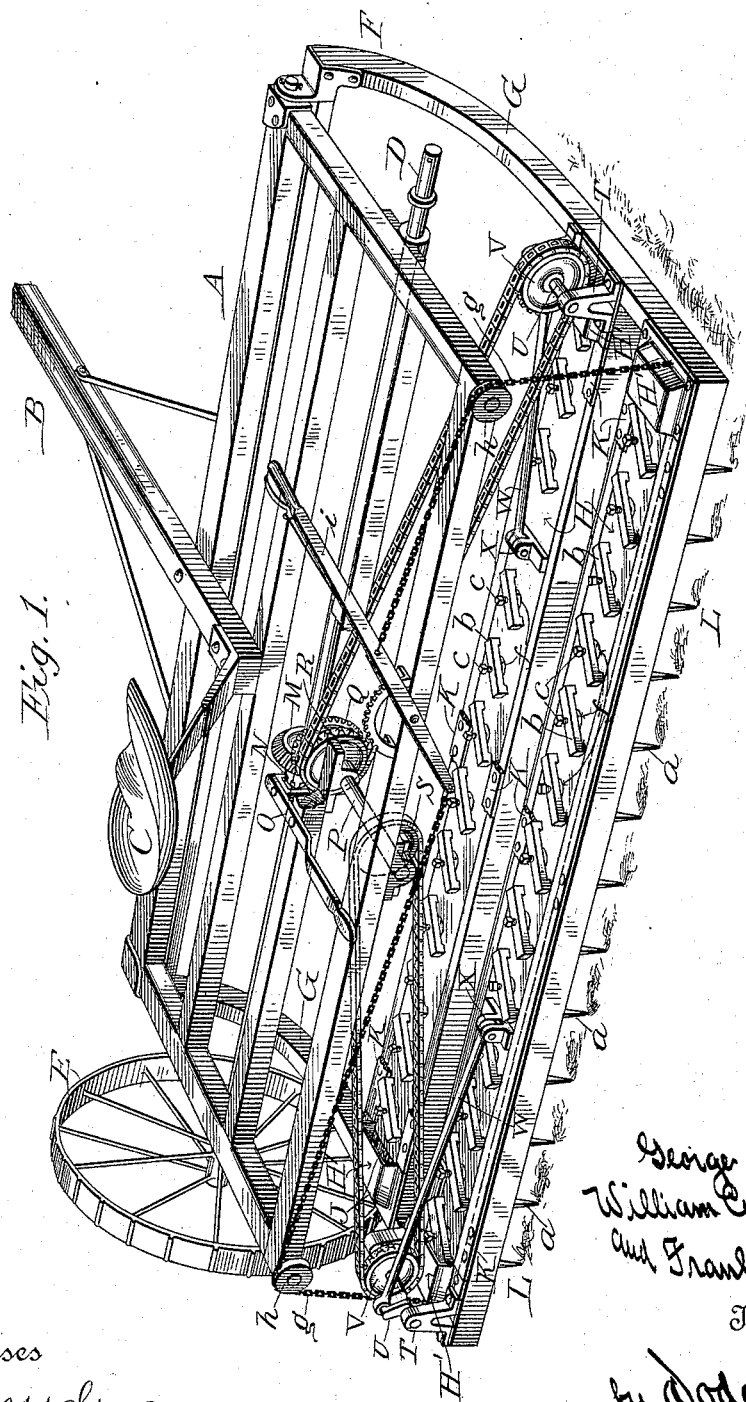

No. 608,121. Patented July 26, 1898.
G. HERR, W. CUNNINGHAM & F. HERR.
HARROW.
(Application filed Jan. 17, 1898.)
(No Model.) 2 Sheets—Sheet 2.
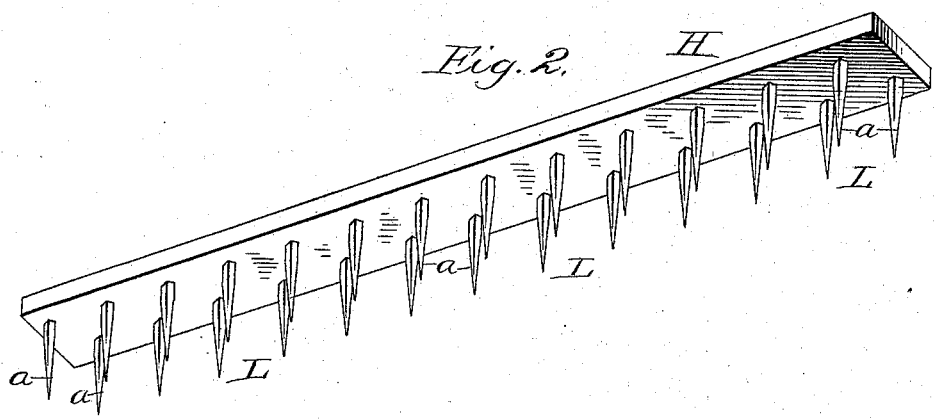
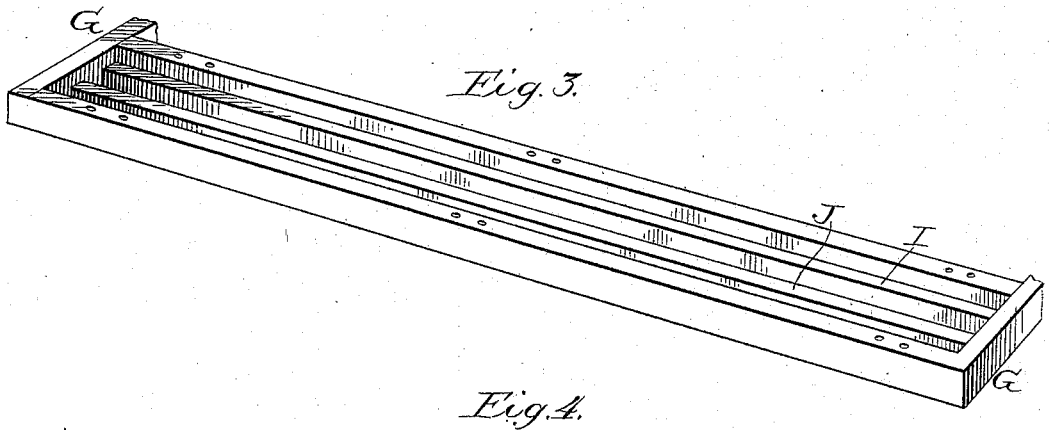
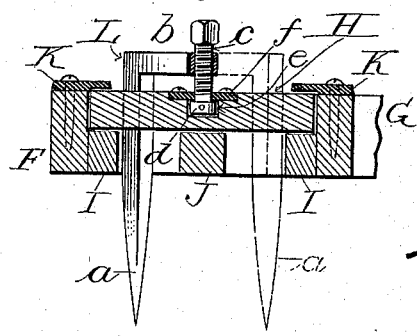
Witnesses
C. C. Burdine
D. E. Burdine
George Herr,
William Cunningham,
and Frank Herr,
Inventors,
by Dodge and Sons,
Attorneys.

UNITED STATES PATENT OFFICE.

GEORGE HERR, WILLIAM CUNNINGHAM, AND FRANK HERR, OF ATWATER, MINNESOTA.

HARROW.

SPECIFICATION forming part of Letters Patent No. 608,121, dated July 26, 1898.

Application filed January 17, 1898. Serial No. 666,975. (No model.)

*To all whom it may concern:*

Be it known that we, GEORGE HERR, WILLIAM CUNNINGHAM, and FRANK HERR, citizens of the United States, residing at Atwater, in the county of Kandiyohi and State of Minnesota, have invented certain new and useful Improvements in Harrows or Pulverizers, of which the following is a specification.

Our present invention relates to harrows or pulverizers, and will be hereinafter fully set forth, reference being had to the annexed drawings, wherein—

Figure 1 is a perspective view of our machine; Fig. 2, a similar view of one of the reciprocating tooth-carrying bars; Fig. 3, a perspective view of a portion of the lower frame, and Fig. 4 a cross-sectional view of one of the tooth-carrying bars and a portion of the supporting-frame.

The object of our invention is to provide a simple and effective machine of its class, and also to provide means for adjusting the frame which carries the reciprocating tooth-bars and also for regulating the working depth of the teeth independent of the adjustment of the frame.

Referring to Fig. 1, A indicates the main frame of the machine, provided with a pole B and a driver's seat C. An axle D is journaled on the frame and one of the carrying-wheels E is made fast thereto to impart motion to said shaft, while the other is preferably loose thereon.

F indicates a second frame pivoted, as shown, to the forward part of the main frame A, the side bars G of said hinged frame being preferably curved upward at their forward end, as shown in Fig. 1.

In the rear part of the pivoted frame there are mounted slides or bars H, the bars being of a length shorter than the width of the frame and resting on cross-pieces I I at their edges and supported at their center by a cross-piece J, as is clearly shown in Fig. 4. To hold the bars down upon their supports, suitable clips, such as K, are secured to the frame and extend out over the bars, thus preventing the bars from rising, while at the same time permitting a free endwise movement.

L denotes the teeth, which, as shown in Figs. 1 and 4, comprise two downwardly-extending arms $a$, connected by a cross bar or head $b$. Said cross bar or head is provided with a central threaded opening, in which is mounted a screw $c$, having secured to its lower end a collar or head $d$, as shown in Fig. 4. Said collar works in a groove or channel $e$, formed in the bar H, and over said head is secured a plate $f$. By turning the screws in the proper direction the teeth may be raised or lowered. The arms $a$ extend down through openings formed in the bars H and work between the spaces or ways formed between the cross-pieces I I and J. It will also be noted upon reference to Figs. 1 and 2 that the cross-heads $b$ of the teeth are set at an angle to the longitudinal axis of the bars H, so that the members $a$ of each tooth are not in the same line relative to the forward movement of the machine. In other words, the rear member of each tooth occupies a position intermediate between the front member of the same tooth and the next succeeding one.

Upon axle D there is loosely mounted a bevel-gear M, which may be connected therewith through a sliding clutch N, controllable by a lever O. A shaft P is mounted upon the frame A and carries at its forward end a bevel-gear Q, which meshes with the gear M and receives motion therefrom. There are also secured upon said shaft P sprocket-wheels R and S.

Secured upon each of the side bars G are standards T, in which there is mounted a cranked axle U, carrying a sprocket-wheel V. A pitman W is connected at one end to the cranked axle, its opposite end being secured to bar or slide H through a bracket X. The arrangement for each slide is the same, and sprocket-chains Y extend from the sprockets R and S to the sprockets V, as indicated in Fig. 1, so that as the machine is drawn forward a reciprocating movement is imparted to the bars or slides.

In the position indicated in Fig. 1 the pivoted frame is in its lowermost position, and to provide for its elevation chains $g$ are connected to each side thereof, said chains passing up over pulleys or sheaves $h$ and connected to a lever $i$, pivoted to the rear of the main frame. Suitable means will be employed for holding the lever in its adjusted position.

It is manifest that means other than that described may be employed for raising and lowering the teeth in relation to the bars H, and we do not desire to limit ourselves to the exact details shown.

By regulating the height of the teeth and the height of the pivoted frame the machine may be made to work to advantage upon any class or grade of soil.

It is manifest that both of the carrying-wheels may be connected with the driving-shaft or the axle in such manner that both of them will serve to drive said axle; but in this event the usual clutch mechanism will have to be employed.

As shown in Fig. 1, the ends of the reciprocating bars H may pass under suitable covers H' to prevent any foreign matter dropping in and obstructing the free operation of the bars upon their slides.

In the case of heavy machines extra pitman-rods may of course be employed.

Having thus described our invention, what we claim is—

1. In a harrow, the combination of a main frame; an axle and driving-wheels; a secondary frame hinged to the main frame; sliding bars mounted in said hinged frame; teeth mounted in said bars; cranked axles mounted on the secondary frame; pitmen connecting said axles with the bars; and connections between the main axle and said cranked axles for imparting motion thereto.

2. In a harrow, the combination of a main frame; an axle and driving-wheels; a secondary frame hinged to the main frame; reciprocating bars mounted in said secondary frame; adjustable teeth mounted in said bars; cranked axles mounted on said secondary frame; pitmen connecting the bars and cranked axles; a shaft P carried by the main frame and provided with sprocket-wheels R and S; driving connections between said shaft and the main axle; and driving-belts extending from sprockets R and S to the cranked axles.

3. In combination with a reciprocating bar; a U-shaped tooth mounted therein; and means for adjusting the tooth up and down therein.

4. A tooth for harrows and the like comprising two arms connected at one end by a cross-head; and attaching and adjusting means mounted in said head.

5. In combination with a bar as H, provided with openings; a tooth L mounted therein, comprising two arms or members $a$ connected by a cross-head $b$; and an adjusting-screw mounted in said head and connected to the bar, substantially as described.

6. In a harrow, the combination of a frame, provided with transverse bars I I and J; a slide H mounted thereon; means for retaining said slide in place; and a series of adjustable teeth mounted in said slide, substantially as described.

In witness whereof we hereunto set our hands in the presence of two witnesses.

GEORGE HERR.
WILLIAM CUNNINGHAM.
FRANK HERR.

Witnesses:
L. E. COVELL,
FRANK L. SALTER.